United States Patent [19]

Bacskai et al.

[11] 4,151,221

[45] Apr. 24, 1979

[54] POLY-2-PYRROLIDONE COMPOSITION HAVING IMPROVED STABILITY AND METHOD OF EXTRUDING

[75] Inventors: Robert Bacskai, Kensington; Phillip H. Parker, San Rafael, both of Calif.

[73] Assignee: Chevron Research Company, San Francisco, Calif.

[21] Appl. No.: 875,979

[22] Filed: Feb. 8, 1978

[51] Int. Cl.$^2$ .............................................. C08L 77/00
[52] U.S. Cl. .................. 260/857 PE; 260/31.8 N; 260/31.8 XA; 528/292; 528/326
[58] Field of Search ................... 260/857 PE, 857 DE

[56] References Cited

U.S. PATENT DOCUMENTS 3,097,181   7/1963   Glickman .................... 260/857 R

OTHER PUBLICATIONS

Kuroda, Y. et al., Chemical Abstracts, vol. 83, No. 29706J (1975), citing Japan Kokai 75, 12,328.
Kuroda, Yoji et al., Chemical Abstracts, vol. 83, No. 29.709n (1975), citing Japan Kokai 75, 12,325.

*Primary Examiner*—Paul Lieberman
*Attorney, Agent, or Firm*—Dix A. Newell; T. G. DeJonghe; Lawrence S. Squires

[57] ABSTRACT

Poly-2-pyrrolidone compositions having improved resistance to thermal reversion to pyrrolidone via the incorporation of certain polyesters and methods of melt extruding such compositions.

8 Claims, No Drawings

POLY-2-PYRROLIDONE COMPOSITION HAVING IMPROVED STABILITY AND METHOD OF EXTRUDING

BACKGROUND OF THE INVENTION

1. Field of The Invention

This invention relates to poly-2pyrrolidone compositions containing a small amount of certain polyesters. In another aspect, this invention relates to methods of extruding such compositions.

2. The Prior Art

Poly-2-pyrrolidone is the source of a useful synthetic fiber for the textile industry. The melt-sprinnable white solid polymer is produced by the alkaline-catalyzed polymerization of 2-pyrrolidone in the presence of carbon dioxide (see U.S. Pat. No. 3,721,652). Polypyrrolidone so-produced is melt-spun into filaments by extrusion from multi-hole spinnerets. In meltspinning, the polymer composition is extruded in a molten condition at a melt temperature which is generally greater than about 270° C. The extrusion must be carried out with care because of the tendency of the polymer to thermally degrade and revert to monomer. Degradation produces an unacceptable extrudate containing foam or bubbles. If extrusion is attempted at appreciably lower temperatures to avoid thermal decomposition, fibers of lower tensile strength are produced. Consequently, in order to melt extrude polypyrrolidone efficiently, one may either seek to increase the thermal stability of the polymer, or to improve the extrudability of the polymeric composition.

The unusual propensity of poly-2-pyrrolidone to thermally degrade back to its monomer and the adverse effect on melt spinning or extrusion is recognized to be a serious problem and the prior art has made a number of attempts to mitigate this problem. For example, U.S. Pat. No. 3,052,654 attempts to reduce the degradation during melt extrusion by pre-heating the poly-2-pyrrolidone to remove degradation products, e.g., pyrrolidone. U.S. Pat. No. 3,017,393 teaches that the extrusion problem may be alleviated by washing or treating the polymer with an aqueous organic carboxylic acid solution and U.S. Pat. No. 3,072,615 teaches using dilute aqueous fatty acid.

U.S. Pat. No. 3,009,893 teaches that the problem may be reduced by the incorporation of relatively large amounts of certain substances which apparently function as melting point depressants.

The prior art has also proposed various other additives to mitigate this problem, however, the problem is necessarily empirical in nature and until a given substance has actually been tried, it cannot be predicted whether it will have a beneficial effect.

It has now been discovered that a significant reduction in thermal monomer reversion can be made by the incorporation of very small amounts of certain polyesters. This is particularly surprising since tests using dioctylphthalate showed substantially lower enhancements in thermal stability.

U.S. Pat. No. 3,097,181 broadly suggests blending various filament-forming polymers (e.g., nylon 66, nylon 6, polyesters, acrylics, polyvinyl resins, polyolefins, cellulose triacetite, etc.) with poly-2-pyrrolidone in order to obtain a fiber having a desirable combination of the properties of poly-2-pyrrolidone and other polymer.

SUMMARY OF THE INVENTION

In summary, the composition of the invention comprises a major amount of normally solid poly-2-pyrrolidone and 0.1 to 0.8% by weight, based on the poly-2-pyrrolidone, of a polyester.

In summary the process of the invention comprises melt extruding said composition at extrusion melt temperatures in the range of about 260°-280° C.

FURTHER DESCRIPTION OF THE INVENTION AND PREFERRED EMBODIMENTS

A useful synthetic fiber is produced by the melt extrusion, at melt temperatures in the range of about 260°-280° C., preferably less than 275° C., and most preferably below about 270° C., of a composition comprising a major amount of polypyrrolidone and 0.1 to 0.8% weight, based on the poly-2-pyrrolidone, of a polyester having the formula:

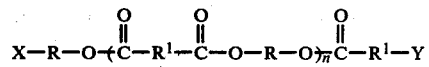

wherein R and $R^1$ are independently alkyl, cycloalkyl, or aryl; X and Y are independently —OH or —COOH, and n is a whole integer from 4 to 150. Preferably, the polyester has a weight average molecular weight in the range of about from 700 to 25,000.

As used herein, the following terms have the following meanings unless expressly stated to the contrary. The term "alkyl" refers to both straight chained and branched chained alkyl groups, typically having from 1 through 20 carbon atoms and preferably having 1 through 6 carbon atoms. Typical alkyl groups include, for example, methyl, ethyl, isopropyl, n-butyl, t-butyl, hexane, decane, tetradecane, 4-methylhexadecane, eicosane, and the like.

The term "cycloalkyl" refers to monocycloalkyl groups having 3 through 8 carbon atoms. Typical cycloalkyl groups include, for example, cyclopropyl, cyclopentyl, cyclohexyl, cyclooctyl and the like.

The term "aryl" refers to a group having one aromatic (unsaturated) carbocyclic having 6 to 10 carbon atoms and preferably is phenyl.

The polyesters used in the invention are generally known compounds and can be prepared by known procedures or by obvious modifications thereof. For example, by the reaction of a dihydric alcohol (e.g., ethylene glycol; 1,4-butanediol; cyclohexane-1,4-diol; etc.) and a dibasic acid (e.g., succinic acid; adipic acid; diglycolic acid; isophthalic acid; etc.). Also, as is well recognized, the polyester can be prepared to have —OH or —COOH end groups or both depending on the particular processing conditions used. Suitable polyesters which can be used include, for example, polyethylene adipate, polypropylene adipate, polyethylene sebacate, polyethylene phthalate, and the like, and mixtures thereof. Preferably a polypropylene adipate is used.

The amount of polyester used should be within the range of about from 0.1 to 0.8 weight percent based on the weight of poly-2-pyrrolidone. Lower amounts of polyester are generally ineffective to produce any significant reduction in monomer formation and higher amounts fail to produce any enhancement in test results over the specified range. Further, based on preliminary results, the improvement in thermal stability maximizes below 1%.

The polyester can be mixed with the poly-2-pyrrolidone composition by any suitable method. For example, the materials can be conveniently mixed by coating pellets of poly-2-pyrrolidone with the polyester before extrusion, or by pelletizing the poly-2-pyrrolidone resin with the requisite amount of polyester.

The improvement in thermal stability permits the poly-2-pyrrolidone composition to be continuously extruded at melt temperatures in the range 260°–280° C. and preferably less than about 270°–275° C., with very significantly fewer breaks, dripping, foam or bubbles, using ordinary commercial spinning equipment known to the synthetic textile art.

The "normally solid" poly-2-pyrrolidone used in the present invention typically has a weight average molecular weight in excess of about 5000 (typically about from 5000 to 500,000) and preferably in excess of about 50,000. Higher molecular weight poly-2-pyrrolidone polymers could also be used.

Thermal stabilization was determined, by the measurement of weight loss by the polypyrrolidone polymer on a Mettler FP-1 hot stage at 269° C. over a period of five minutes, with and without the presence of the particular additive. The monomer generated by this heat treatment is completely removed by extraction with water. The difference in weight between the starting polymer and the thermally treated dry extracted polymer is the weight loss. The results are summarized hereinbelow in Table I. As can be seen from the following Table I, the polyester containing composition produced an average decrease in weight loss of more than about 15 weight percent in this test.

TABLE I

| Ex. No. | Polyester Wt. % | % Decrease in Wt. Loss |
| --- | --- | --- |
| Run 1-1 | 0.5 | 32 |
| Run 1-2 | 1.0 | 25 |
| Run 2-1 | 0.5 | 16 |

Runs 1-1 and 1-2 were conducted using poly-2-pyrrolidone obtained from the same batch. Run 2-1 was conducted using poly-2-pyrrolidone from a different batch and was not conducted at 1%.

As can be seen from the first run, a greater improvement in thermal stability was obtained using only 0.5% polyester as compared with 1%. Also, although substantially poorer results were obtained in the second run, a 16% decrease in monomer loss was still obtained.

The particular polyester used for all the tests was a medium-high molecular weight polyester having a maximum acid value of 2.0 and maximum hydroxyl value of 20, and sold under the trademark "PLASTOLEIN 9776" by Emery Industries, Inc.

Obviously, many modifications and variations of the invention, described hereinabove and below in the claims, can be made without departing from the essence and scope thereof.

What is claimed is:

1. A composition comprising a major amount of normally solid poly-2-pyrrolidone and an amount of polyester, effective to reduce the thermal degradation of said poly-2-pyrrolidone to monomer, in the range of 0.1 to 0.8% by weight, based on the poly-2-pyrrolidone, and wherein said polyester is selected from the group having the formula:

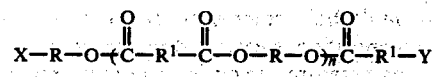

wherein R and $R^1$ are independently selected from the group consisting of alkyl, having 1 through 20 carbon atoms; cycloalkyl having 3 through 8 carbon atoms and aryl having 6 through 12 carbon atoms; X and Y are independently —OH or —COOH; and n is a whole integer of from 4 to 150.

2. The composition of claim 1 wherein said aryl is phenyl.

3. The composition of claim 1 wherein said aryl is phenyl and said alkyl has 1 through 6 carbon atoms.

4. The composition of claim 1 wherein said polyester has a weight average molecular weight in the range of about from 700 to 25,000.

5. The composition of claim 1 wherein said polyester is selected from the group consisting of polyethylene adipate, polypropylene adipate, polypropylene sebacate, polyethylene phthalate, and mixtures thereof.

6. The composition of claim 5 wherein said polyester is a polypropylene adipate.

7. A method of melt extruding poly-2-pyrrolidone comprising melt extruding the composition of claim 1 at temperatures in the range of about from 260°–280° C.

8. The method of claim 7 wherein said composition is extruded at temperatures in the range of about from 260°–270° C.